(12) United States Patent
Napier et al.

(10) Patent No.: US 11,314,508 B1
(45) Date of Patent: Apr. 26, 2022

(54) FPGA-BASED COMPUTING SYSTEM FOR PROCESSING DATA IN SIZE, WEIGHT, AND POWER CONSTRAINED ENVIRONMENTS

(71) Applicant: National Technology & Engineering Solutions of Sandia, LLC, Albuquerque, NM (US)

(72) Inventors: Matthew Peter Napier, Cedar City, UT (US); David S. Lee, Albuquerque, NM (US); Gregory Philip Anders, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 0 days.

(21) Appl. No.: 17/163,754

(22) Filed: Feb. 1, 2021

(51) Int. Cl.
*G06F 9/30* (2018.01)
*G06F 9/38* (2018.01)
*G06F 12/0853* (2016.01)
*G06F 13/16* (2006.01)
*G06F 12/02* (2006.01)

(52) U.S. Cl.
CPC .......... *G06F 9/3004* (2013.01); *G06F 9/3885* (2013.01); *G06F 12/0238* (2013.01); *G06F 12/0853* (2013.01); *G06F 13/1668* (2013.01); *G06F 2212/7201* (2013.01)

(58) Field of Classification Search
None
See application file for complete search history.

(56) References Cited

U.S. PATENT DOCUMENTS

| | | | |
|---|---|---|---|
| 7,260,794 B2 | 8/2007 | Butts | |
| 8,239,590 B1 | 8/2012 | Wennekamp et al. | |
| 8,473,880 B1 | 6/2013 | Bennett et al. | |
| 9,195,784 B2 | 11/2015 | Tseng et al. | |
| 10,540,588 B2 | 1/2020 | Burger et al. | |
| 10,956,346 B1* | 3/2021 | Ben-Yehuda | G06F 13/4027 |
| 11,023,336 B2* | 6/2021 | Sity | G06F 8/41 |
| 2018/0121796 A1* | 5/2018 | Deisher | G06N 3/0472 |
| 2018/0285106 A1* | 10/2018 | Appu | G06T 1/60 |
| 2021/0326175 A1* | 10/2021 | Herbert | G06F 9/4881 |

\* cited by examiner

*Primary Examiner* — Michael Sun
(74) *Attorney, Agent, or Firm* — Medley, Behrens & Lewis, LLC; Samantha Updegraff (57) ABSTRACT

Technologies that are well-suited for use in size, weight, and power (SWAP)-constrained environments are described herein. A host controller dispatches data processing instructions to hardware acceleration engines (HAEs) of one or more field programmable gate arrays (FPGAs) and further dispatches data transfer instructions to a memory controller, such that the HAEs perform processing operations on data stored in local memory devices of the HAEs in parallel with other data being transferred from external memory devices coupled to the FPGA(s) to the local memory devices.

20 Claims, 6 Drawing Sheets

FPGA-BASED COMPUTING SYSTEM FOR PROCESSING DATA IN SIZE, WEIGHT, AND POWER CONSTRAINED ENVIRONMENTS

STATEMENT OF GOVERNMENTAL INTEREST

This invention was made with Government support under Contract No. DE-NA0003525 awarded by the United States Department of Energy/National Nuclear Security Administration. The U.S. Government has certain rights in the invention.

BACKGROUND

An orbiting (man-made) satellite can be equipped with a high-resolution focal plane array that is used to generate images at a relatively high frame rate. It is desirable to process images generated by the FPA onboard the satellite, as transmitting the high-resolution images from the satellite to a ground station requires more bandwidth than is typically available on a wireless communications channel between the orbiting satellite and the ground station.

Processing large amounts of data in such an environment in real-time (e.g., as images are generated), however, is non-trivial, as limitations associated with the environment where processing is to be undertaken must be accounted for when designing an architecture for processing large amounts of data, such as FPA images. For instance, a computing system onboard an orbiting satellite that is configured to process images generated through use of an FPA must meet size, weight, and power (SWAP) constraints that are associated with the orbiting satellite. As algorithms that are to be executed by computing systems in SWAP-constrained environments have become increasingly complex, meeting SWAP constraints has become increasingly difficult.

In an example, graphical processing units (GPUs) are designed to be well-suited for executing complex algorithms in environments that are not SWAP-constrained; however, because GPUs have predefined instructions sets that are somewhat limited, GPUs may consume a relatively high amount of power when executing a relatively complex algorithm over large amounts of data. Thus, employing a GPU or a bank of GPUs to execute a relatively complex algorithm in an orbiting satellite in connection with processing FPA images may violate a predefined power constraint. Central processing units (CPUs) are less efficient than GPUs when processing image data, due to inherent limitations of CPUs with respect to parallel processing tasks. Application-specific integrated circuits (ASICs) can be custom-designed to execute complex algorithms that include parallel processing tasks and that meet SWAP constraints; however, once manufactured, ASICs cannot be changed, and therefore there is no way for an algorithm designer to update the algorithm once an ASIC that has been custom-designed to execute the algorithm once the ASIC has been deployed.

A field programmable gate arrays (FPGA) can be programmed such that certain processing tasks can be performed much more efficiently on the FPGA than such tasks can be performed on a GPU or CPU. In addition, the FPGA is programmable, such that the circuitry of the FPGA can be updated if an algorithm designer updates an algorithm. It has been found, however, that using FPGAs for onboard processing of images generated by FPAs on an orbiting satellite through use of complex algorithms violates SWAP constraints associated with such environment, due to inefficiencies that are inherent in conventional algorithm execution on FPGAs. For example, a simulation indicated that 32-120 separate FPGAs would be required to execute a proposed algorithm for processing images generated by FPAs on an orbiting satellite, wherein such a large number of FPGAs violates the SWAP constraints associated with the environment.

SUMMARY

The following is a brief summary of subject matter that is described in greater detail herein. This summary is not intended to be limiting as to the scope of the claims.

Described herein are various technologies that are well-suited for use in connection with processing relatively large amounts of data in an environment with size, weight, and power (SWAP) constraints, such as an orbiting satellite. In a nonlimiting example, the technologies described herein are well suited for real-time processing of images generated by one or more focal plane arrays (FPAs) onboard an orbiting satellite.

A computing system that is configured to process data in a SWAP-constrained environment includes a host controller that executes an algorithm, wherein the algorithm, when executed by the host controller, causes the computing system to process data. In an example, the host controller may be included in a field programmable gate array (FPGA). In another example, the host controller may be external to an FPGA, but is in communication with one or more FPGAs.

The computing system further includes a local memory device that is internal the FPGA, wherein the local memory device has first data stored therein, and further wherein the first data is a portion of the data that is to be processed by the computing system. For instance, the first data may be a portion of an image generated by an FPA onboard the orbiting satellite. Further, and in another example, the local memory device can be a Dual Port Static Random Access Memory (DPSRAM) device of the FPGA.

The computing system also includes a hardware acceleration engine (HAE) that is implemented in fabric of the FPGA, wherein the HAE includes circuitry that is configured to efficiently perform a particular processing operation. The HAE is operably coupled to the host controller and the local memory device. The host controller, based upon the algorithm being executed by the host controller, can transmit a first instruction to the HAE, wherein the first instruction is configured to cause the HAE to retrieve the first data from the local memory device and perform the processing operation with respect to the first data. Thus, the HAE, upon receipt of the first instruction, retrieves the first data from the local memory device, performs the processing operation with respect to the first data, and generates output data based upon the first data. In an example, the output data can be written back to the local memory device or can be placed in a buffer or register of the HAE.

The computing system additionally includes an external memory device that is external to the FPGA and coupled to the FPGA, wherein the external memory device has second data stored therein, and further wherein the second data is to be processed by the algorithm or in accordance with the algorithm. Pursuant to an example, the external memory device can be a Printed Circuit Board (PCB) Double Data Rate Synchronous Dynamic Random Access Memory (DDR SDRAM) device or silicon interposer integrated High Bandwidth Memory (HBM).

The computing system additionally includes a memory control engine (MCE), which can optionally be a memory dispatch engine (MDE) MCE, wherein the MCE can be included in the FPGA or external to the FPGA and coupled to the FPGA. The MCE is operably coupled to the host controller, the internal memory device, and the external memory device. The host controller, based upon the algorithm being executed by the host controller, transmits a second instruction to the MCE, wherein the second instruction is configured to cause the second data to be transferred from the external memory device to the internal memory device. The MCE, upon receipt of the second instruction, causes the second data to be transferred from the external memory device to the internal memory device of the FPGA (which is directly accessible to the HAE). Further, the HAE performs the processing operation on the first data in parallel with the second data being transferred from the external memory device to the internal memory device. The parallel movement of data into the internal memory device of the FPGA and processing of data in the internal memory device of the FPGA (by the HAE) allows the FPGA to perform more processing operations over time than is possible with conventional approaches using FPGAs, and thus allows the computing system to meet SWAP constraints associated with onboard processing performed in an orbiting satellite.

It can be ascertained that the architecture described herein is extendible. For example, an FPGA may include several HAEs and may further include several external memory devices. The host controller can dispatch instructions to one or more of the HAEs and can further dispatch instructions to the MCE such that data can be processed by the HAEs simultaneously with other data being transferred from the external memory device to internal memory device(s) that are directly accessible to the HAEs. Thus, the host controller can transmit instructions that result in data being transferred from external memory devices to internal memory devices simultaneously with data stored in the internal memory devices being processed by HAEs. Moreover, the architecture can be further extended such that the computing system includes several FPGAs, each (potentially) with several external memory devices coupled thereto, wherein the several FPGAs are employed to perform operations that allow for portions of the algorithm being executed by the host controller to be performed in parallel.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Various technologies pertaining to processing data in a size, weight, and power (SWAP)-constrained environment are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Described herein is a computing system that is well-suited to execute advanced algorithms over relatively large amounts of data in a SWAP-constrained environment. For example, the SWAP-constrained environment may be a satellite that is orbiting the earth, wherein the computing system is onboard the orbiting satellite and is configured to process (in real-time) images output by a focal plane array (FPA) on the orbiting satellite. It is to be understood, however, that features described herein are not limited to such an environment. As will be described in greater detail herein, the computing system includes a host controller, a field programmable gate array (FPGA), and an external memory device that is external to the FPGA and is operably coupled to the FPGA. In contrast to conventional computing systems that include FPGAs, the host controller, when executing an algorithm to process data, can dispatch instructions that: 1) causes a hardware acceleration engine (HAE) in the fabric of the FPGA to perform a processing operation on first data stored in a local memory device that is directly accessible to the HAE; while 2) (and in parallel with the HAE performing the processing operation) causing second data stored in the external memory device to be transferred from the external memory device to the local memory device. This approach reduces the idle time of the HAE, thus enabling the HAE to perform the processing operations more frequently than previously possible, which is highly advantageous in SWAP-constrained environments.

Figure 1:
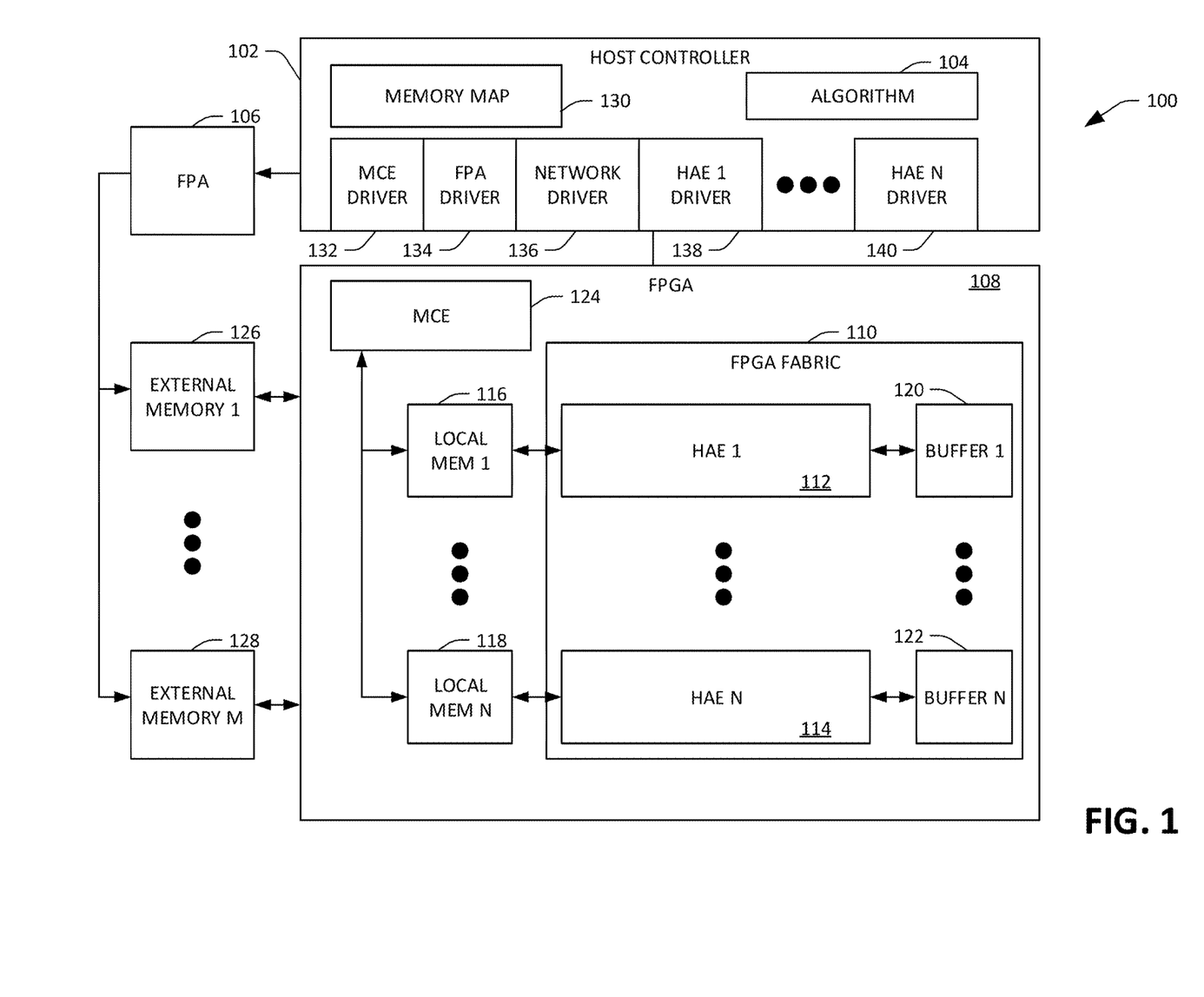
FIG. 1 is a functional block diagram of an exemplary computing system that is well-suited for processing data in size, weight, and power (SWAP)-constrained environments.

With reference now to FIG. 1, a functional block diagram of an exemplary computing system 100 that is well-suited for utilization in SWAP-constrained environments is illustrated. The computing system 100 comprises a host controller 102 that is configured to execute an algorithm 104. In an exemplary embodiment, the algorithm 104 can be developed by an algorithm designer in a relatively high-level programming language, such as C, C++, Python, etc., and can be developed to execute on a fairly light weight operating system, such as embedded Linux, Real Time OS, etc. A focal plane array (FPA) 106 can be operably coupled to the host controller 102. As indicated previously, the computing system 100 may be onboard an orbiting satellite, and the FPA 106 may be configured to capture images of the earth as the satellite orbits the earth. The FPA 106 can generate images at a relatively high frame rate and/or high resolution, wherein the algorithm 104 is configured to perform real-time processing on images output by the FPA 106. For instance, the algorithm 104 can be designed to identify one or more types of objects in images output by the FPA 106 in real-time, such as a certain type of automobile, people moving on the ground, etc.

The computing system 100 additionally includes an FPGA 108, wherein the host controller 102 can optionally be included in the FPGA 108 or may be external to the FPGA 108. The FPGA 108 includes FPGA fabric 110. In the exemplary computing system 100, the FPGA fabric 110 comprises several hardware acceleration engines (HAEs) 112-114. The HAEs 112-114 can be designed to perform certain processing operations in a very efficient manner, including linear matrix operations (multiplication, division, addition, subtraction, dot product, etc.), or any other suitable processing operations that are desirably performed on image data. In an example, the first HAE 112 can be designed to perform a first processing operation, and the Nth HAE can be designed to perform an Nth processing operation that is different from the first processing operation. It is to be understood, however, that multiple of the HAEs in the HAEs 112-114 can be designed to perform the same processing operation.

The FPGA 108 also includes a plurality of local memory devices 116-118 that respectively correspond to the plurality of HAEs 112-114. For example, the first HAE 112 is able to read data from and write data to the first local memory device 116 (but not other local memory devices in the local memory devices 116-118), and the Nth HAE 114 is able to read data from and write data to the Nth local memory device 118 (but not other local memory devices in the local memory devices 116-118). In an example, the local memory devices 116-118 are Dual-Port Static Random Access Memory (DPSRAM) devices, such that, for example, data can simultaneously be written to two different memory locations in the first local memory device 116, data can be simultaneously read from two different locations in the first local memory device 116, and data can be read from one location of the first local memory device 116 simultaneously with other data being written to another location of the first local memory device 116. The FPGA fabric 110 can also include several buffers (and/or registers) 120-122 that respectively correspond to the plurality of HAEs 112-114, wherein the HAEs 112-114 can store intermediate results of processing in the respective buffers 120-122.

The FPGA 108 further includes a memory control engine (MCE) 124 that is in communication with the host controller 102. In an example, a memory dispatch engine (MDE), not shown, may include the MCE 124, although other embodiments are contemplated. The memory MCE 124 is configured to receive instructions from the host controller 102 based upon the algorithm 104 being executed by the host controller 102. As will be described in greater detail below, the MCE 124 is configured to cause data to be transferred amongst memory devices based upon instructions received from the host controller 102.

The computing system 100 also comprises several external memory devices 126-128 that are coupled to the FPGA 108 by way of respective interfaces. In a nonlimiting example, the external memory devices 126-128 may consist of four external memory devices, wherein the external memory devices 126-128 may have the same or different amounts of memory therein. In another nonlimiting example, the external memory devices 126-128 may be Printed Circuit Board (PCB) Double Data Rate Synchronous Dynamic Random Access Memory (DDR SDRAM) devices, silicon interposer integrated High Bandwidth Memory (HBM) devices, some combination thereof, or other suitable memory devices.

The computing system 100 also includes a memory map 130. In FIG. 1, the memory map 130 is illustrated as being stored in the host controller 102 (e.g., in computer-readable storage of the host controller 102); however, the memory map 130 may be stored in computer-readable storage that is external to the host controller 102. The memory map 130 comprises a mapping between types of data that is stored in the external memory devices 126-128, a virtual address space corresponding to the external memory devices 126-128, and physical address spaces corresponding to the external memory devices 126-128. Thus, the host controller 102, when executing the algorithm 104, can ascertain types of data stored across the external memory devices 126-128 when instructing the MCE 124 to transfer data into and out of the external memory devices 126-128.

Figure 2:
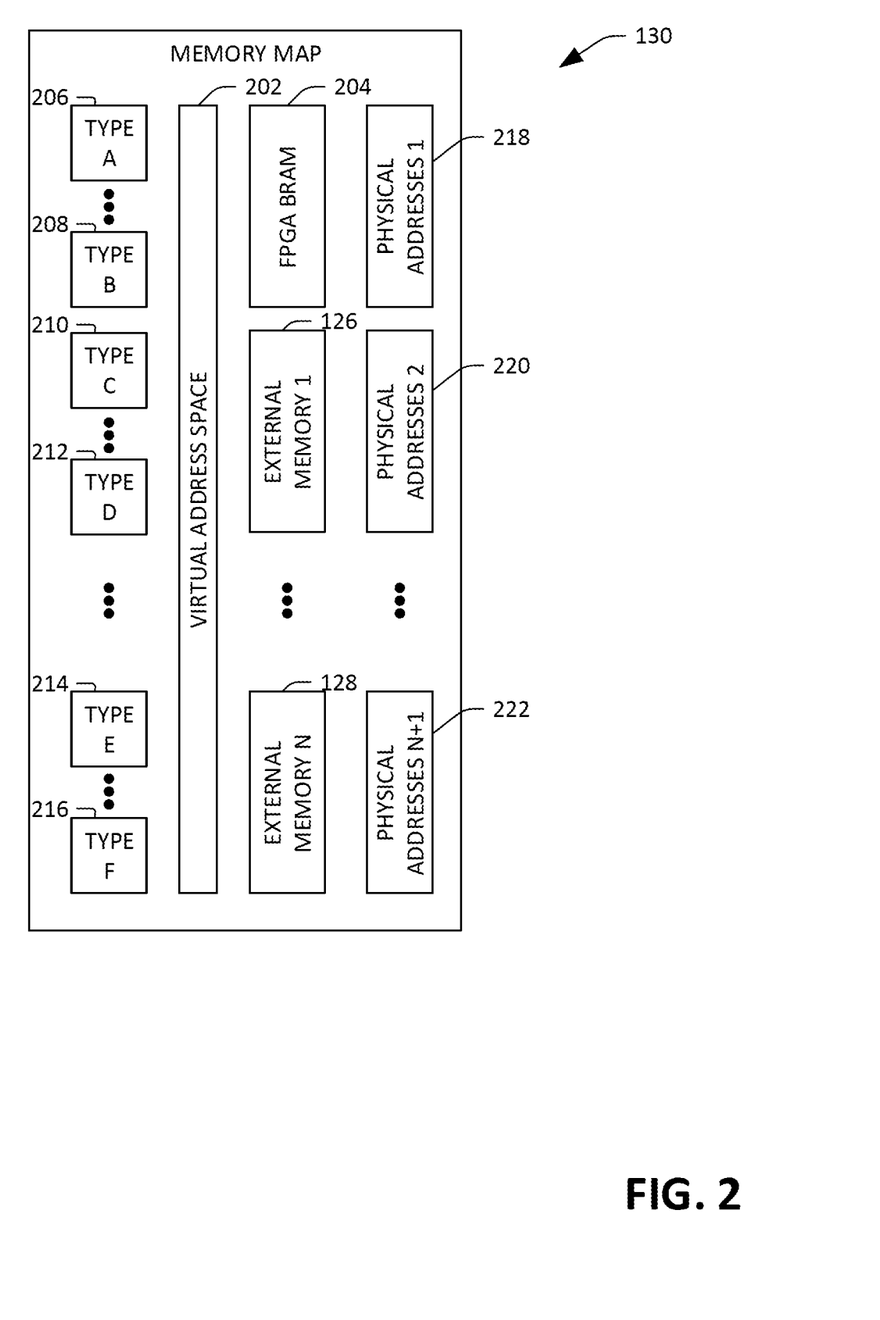
FIG. 2 is a functional block diagram of an exemplary memory map that can be accessed by a host controller, wherein the memory map is configured to map types and/or sources of data to locations in computer-readable storage where the data is stored.

Referring briefly to FIG. 2, an exemplary depiction of the memory map 130 is presented. The memory map 130 includes a virtual address space 202 that, for example, corresponds to the external memory devices 126-128 and FPGA block RAM (BRAM) 204 of the FPGA 108. The memory map 130 may also identify types of data that are stored in storage locations corresponding to addresses in the virtual address space 202, and thus the memory map 130 may identify types of data that are stored in the external memory devices 126-128 and the FPGA BRAM 204. Therefore, as illustrated in FIG. 2, the memory map 130 can indicate that data of type A 206 and type B 208 are stored in storage corresponding to first addresses in the virtual address space 202 that correspond to the FPGA BRAM 204. The memory map 130 can further indicate that data of type C 210 and type D 212 are stored in storage corresponding to second addresses in the virtual address space 202 that correspond to the first external memory device 126. As illustrated, the memory map 130 can further indicate that data of types E 214 and F 216 are stored in storage corresponding to N+1th addresses in the virtual address space 202 that correspond to the Nth external memory device 128.

The memory map 130 can also identify a physical address space for each of the memory devices identified in the memory map 130. Thus, the memory map 130 can identify first physical addresses for the FPGA BRAM 204, second physical addresses 220 for the first external memory device 126, and N+1 physical addresses 222 for the Nth external memory device 128. Accordingly, when the host controller 102 transmits instructions to the MCE 124 to cause data to be moved to or from the external memory devices 126-128

(or the BRAM 204), the host controller 102 need not resolve to the low-level physical addresses of such memory devices. Instead, the host controller 102 can identify a range in the virtual address space 202, and the MCE 124 can identify the appropriate physical address space where such data is stored in the memory devices 204 and 126-128.

Returning to FIG. 1, the host controller 102 can further comprise numerous drivers that are configured to enable the host controller 102 to communicate with other components of the computing system 100. For instance, the host controller 102 can include an MCE driver 132 that is configured to enable the host controller 102 to communicate with the MCE 124. The host controller 102 further includes an FPA driver 134 that enables the host controller 102 to communicate with the FPA 106 (such that the host controller 102 can cause the FPA 106 to generate one or more images). The host controller 102 can also optionally include a network driver 136 that allows the host controller 102 to communicate with the FPGA 108 by way of a network (not shown), and further allows the host controller 102 to communicate with several other FPGAs (not shown) or computing systems by way of the network. The host controller 102 includes HAE drivers 138-140 that enable the host controller 102 to transmit instructions to the HAEs 112-114, respectively.

Figure 3:
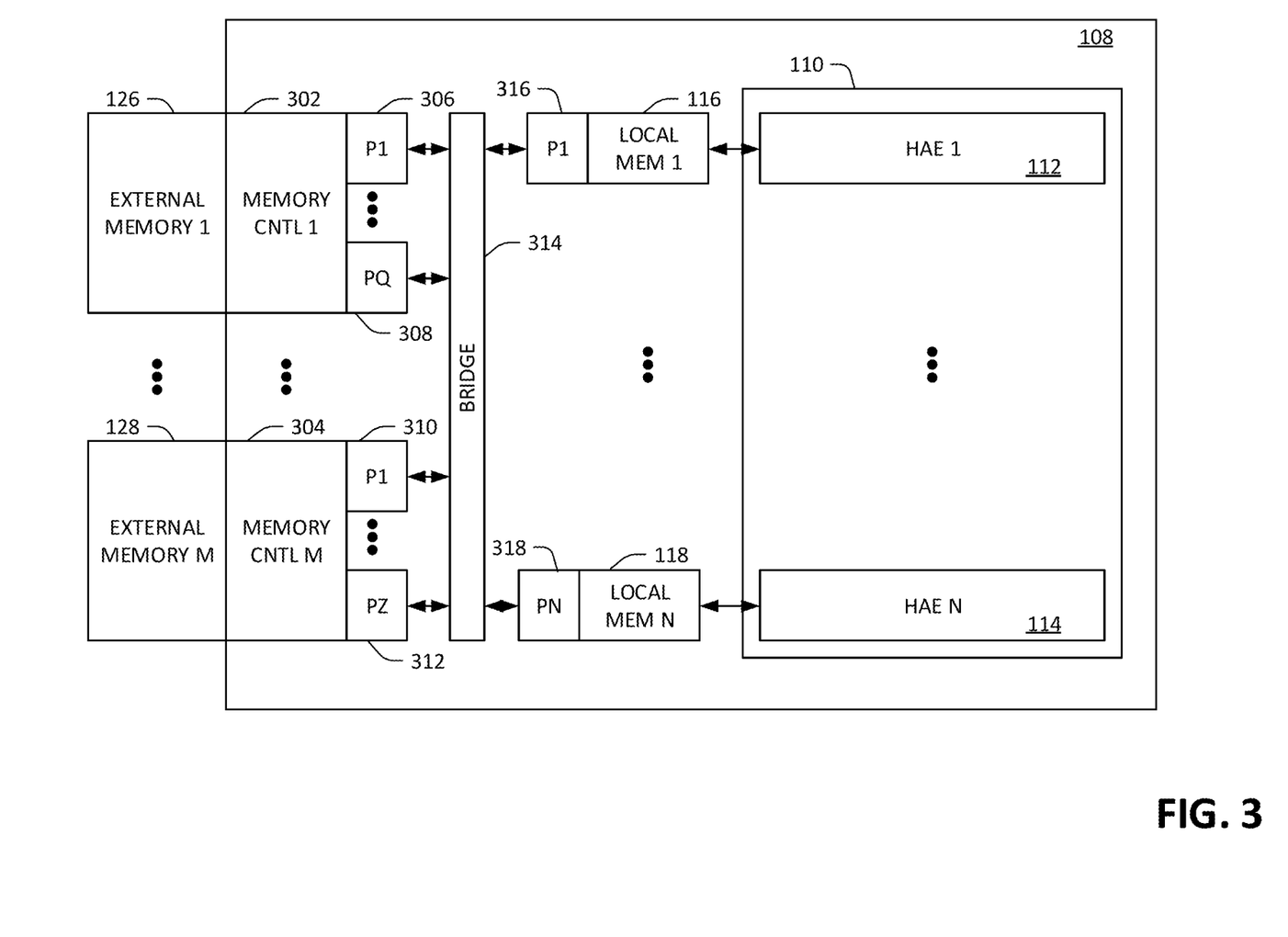
FIG. 3 is a functional block diagram of an exemplary computing system that includes a bridge that can be employed in connection with transferring data from memory devices that are external to an FPGA to local (internal) memory devices of the FPGA.

Referring now to FIG. 3, a functional block diagram of the FPGA 108 is depicted. As described previously, the external memory devices 126-128 are coupled to the FPGA 108. The FPGA 108 includes M memory controllers 302-304 that respectively correspond to the external memory devices 126-128. For instance, the memory controller 302 can include Q ports 306-308, where Q is greater than or equal to one, and further where a stream of bits (e.g., eight bits) can be output by way of each of the ports 306-308 at each clock cycle. Similarly, the memory controller 304 for the Mth external memory device 128 can include Z ports 310-312, where Z is greater than or equal to one, and further where a stream of bits (e.g., eight bits) can be output by way of each of the ports 310-312 at each clock cycle.

The FPGA 108 further includes a bridge 314 by way of which data can be transferred from the external memory devices 126-128 to the local memory devices 116-118 and by way of which data can be transferred from the local memory devices 116-118 to the external memory devices 126-128. The bridge 314 can also be employed to transfer data between memory devices in the external memory devices 126-128 and between memory devices in the local memory devices 116-118. For instance, each of the local memory devices 116-118 can have a respective port that interfaces with the bridge 314. Thus, the first local memory device 116 has a first port 316 that that interfaces with the bridge 314, and the Nth local memory device 118 includes an Nth port 318 that interfaces with the bridge 314. The bridge 314 and the ports 306-308, 310-312, and 316-318 can be designed in accordance with a suitable standard, such as the Advanced eXtendible Interface standard. Thus, in an example, the first memory controller 302 of the first external memory device 126 can receive an instruction from the MCE 124 to transfer data from the first external memory device 126 to the first local memory device 116, and the first memory controller 302 can cause the data to be transferred (by way of one or more of the ports 306-308) to the first port 316 of the first local memory device 116 by way of the bridge 314.

As noted previously, the FPGA 108 includes the HAEs 112-114 in the FPGA fabric 110. The HAEs 112-114 respectively access the local memory devices 116-118 by second ports of such local memory devices 116-118. Therefore, for example, while data is being written to the first local memory device 116 by way of one port of the first local memory device 116 (e.g., from one or more of the external memory devices 126-128), the first HAE 112 can read data from and write data to the first local memory device 116 by way of another port of the first local memory device 116.

Figure 4:
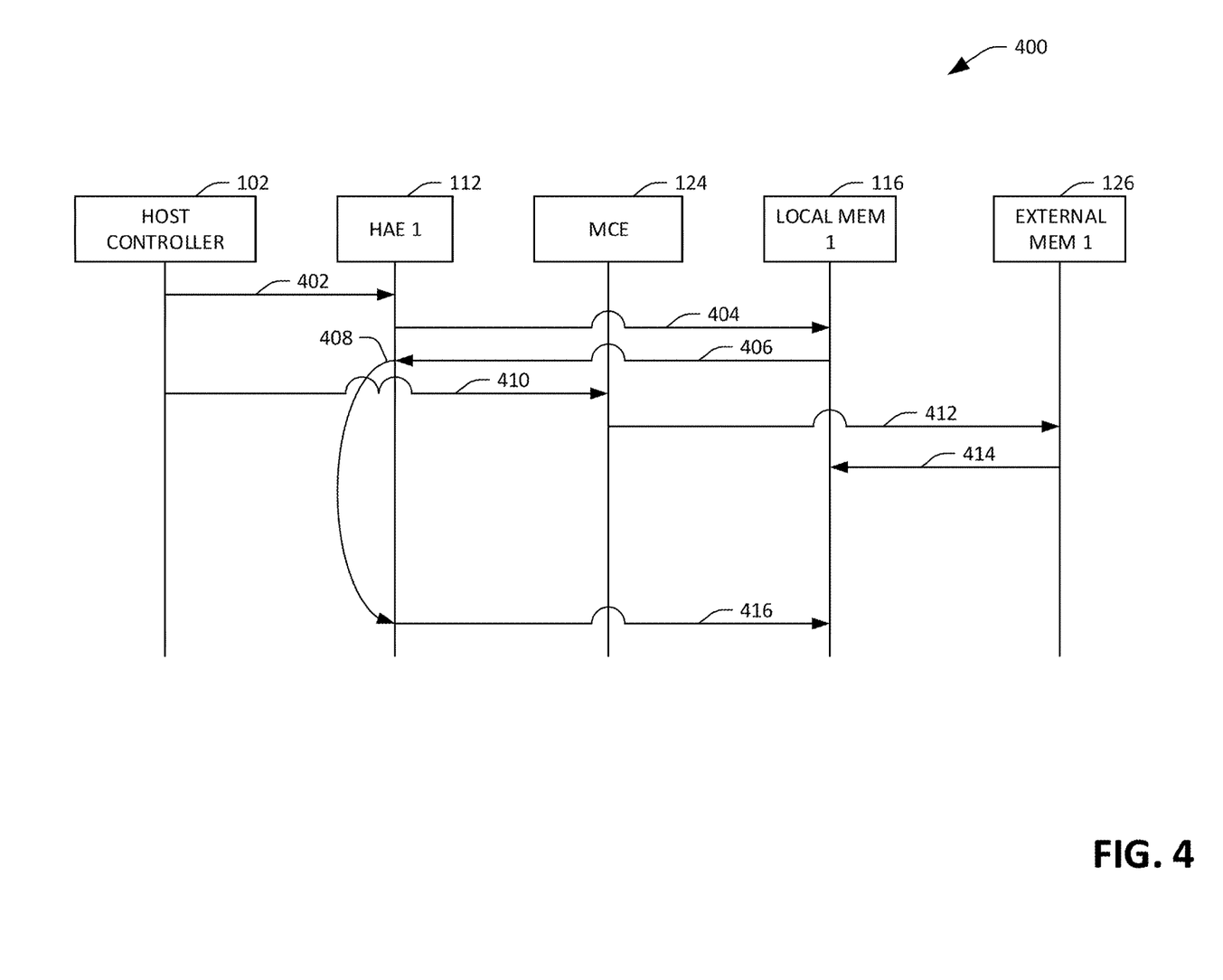
FIG. 4 is a communications diagram illustrating processing of data stored in a local (internal) memory device of an FPGA in parallel with movement of data into the local memory device.

With reference to FIG. 4, a communications diagram 400 that illustrates an exemplary operation of the computing system 100 is depicted. As noted above, the host controller 102 executes the algorithm 104, wherein the algorithm 104, when executed by the host controller 102, is configured to cause the computing system 100 to process data, wherein the data can be of a size between one byte of data and R bytes of data (with R being less than infinity). In an example, the data may include first data and second data that is different from the first data, wherein the first data is stored in the first local memory device 116 and the second data is stored in the first external memory device 126. In a nonlimiting example, the data may comprise an image generated by the FPA 106, wherein the first portion of the data is a first portion of the image and the second portion of the data is a second portion of the image. At 402, based upon the algorithm 104 being executed by the host controller 102, the host controller 102 transmits a first instruction to the first HAE 112 by way of the first HAE driver 138, wherein the first instruction is configured to cause the first HAE 112 to perform a processing operation on the first data that is stored in the first local memory device 116. Thus, at 404, the first HAE 112 requests the first data from the first local memory device 116, and at 406, the first HAE 112 receives the first data from the first local memory device 116. At 408, the first HAE 112 performs the processing operation on the first data that was retrieved from the first local memory device 116.

At a time between when the host controller 102 transmitted the first instruction at 402 and when the first HAE 112 completes performing the processing operation on the first data at 408, the host controller 102, based upon the algorithm 104 that is being executed by the host controller 102, transmits a second instruction 410 to the MCE 124 by way of the MCE driver 132. The second instruction is configured to cause the second data stored in the first external memory device 126 to be transferred from the first external memory device 126 to the first local memory device 116. In an example, the second instruction transmitted at 410 can identify a location of the second data in a virtual address space, wherein the host controller 102 determines the location of the second data in the virtual address space from the memory map 130. The MCE 124 can identify the first external memory device 126 and physical address(es) of the first external memory device 126 where the second data is stored, and can transmit an instruction to the first memory controller 302 that, when received by the first memory controller 302, causes the first memory controller 302 to transfer the second data from the first external memory device 126 to the first local memory device 116 by way of the bridge 314. Thus, at 412, the MCE 124 initiates transfer of the second data from the first external memory device 126 to the first local memory device 116. At 414, the second data is transferred from the first external memory device 126 to the first local memory device 116.

It is noted that the second data is transferred from the first external memory device 126 to the first local memory device 116 simultaneously with the first HAE 112 performing the processing operation on the first data stored in the first local memory device 116. Put differently, the first HAE 112 performs the processing operation on the first data in parallel with the second data being transferred from the first external memory device 126 to the first local memory device 116. Upon the first HAE 112 completing the processing operation on the first data, the first HAE generates output data and at 416, writes the output data to the first local memory device 116. The host controller 102 can initiate transfer of the output data to an appropriate location in one or more of the external memory devices 126-128.

It is emphasized that in accordance with the architecture set forth in FIG. 1, HAEs 112-114 can perform processing operations on data stored in their local memory devices 116-118 in parallel with other data that is to be processed in the future being transferred from one or more of the extra memory devices 126-128 to the appropriate local memory devices 116-118. This is in contrast to conventional approaches where FPGAs are employed to process data. Conventionally, performing processing operations and data transfers occurs sequentially; more specifically, an HAE will indicate when a processing operation on data is complete, at which point output data is transferred out of local memory, and subsequently new data is transferred to the local memory of the HAE. This conventional approach, dictated by conventional FPGA architectures, however, causes the HAE to be idle while data is being transferred into or out of the local memory device of the HAE. In contrast, in the approach described herein, the host controller 102 decouples instructions to process data from instructions to transfer data; therefore, the computing system 100 illustrated in FIG. 1 can meet SWAP constraints that cannot be met utilizing conventional approaches with FPGAs.

Further, it is to be understood that the communications diagram depicted in FIG. 4 depicts a relatively small number of acts, and this diagram can be extended to depict several different acts. That is, the host controller 102 can transmit instructions that cause the first HAE 112 to perform the first processing operation on the first data in parallel with the Nth HAE 114 performing an Nth processing operation on the Nth data. Moreover, the host controller 102 can transmit instructions that cause the second data to be transferred from the first external memory device 126 to the first local memory device 116 in parallel with third stored in the first external memory device 126 being transferred to the Nth local memory device 118 of the Nth HAE 114. Accordingly, multiple different portions of data stored in the first external memory device 126 can be transferred in parallel to multiple different local memory devices of multiple different HAEs. Still further, different data from different external memory devices can be transferred from such external memory devices to different local memory devices of different HAEs in parallel, which can further be in parallel with the different HAEs processing other data that is stored in the local memory devices of the HAEs. Such approach enables a relatively small number of FPGAs to be designed to perform complex processing over large amounts of data.

The architecture illustrated and described herein also exhibits other advantages over conventional FPGA architectures, particularly with respect to executing complex algorithms in SWAP-constrained environments. For instance, each of the HAEs 112-114 can represent a particular optimized instruction subset, wherein each HAE is optimized to execute such subset. Thus, more specifically, the first HAE 112 represents a first optimized instruction subset in the algorithm 104. The first HAE 112 can be caused to perform its operation multiple times when the algorithm is being executed by the host controller 102. In addition, when host controller 102 is not executing the algorithm 104, the FPGA can use the first HAE 112 when some other algorithm includes a reference to the first optimized instruction set. Historical FPGA implementations dedicate resources to a specific algorithm; thus, conventionally, if the host controller 102 were not executing the algorithm, the first HAE 112 would remain idle, thereby creating resource inefficiencies. With the HAE approach and architecture described herein, multiple algorithms within a chip can be supported through use of a common and unique HAE instruction set.

In addition, while not shown, HAEs can be grouped into sets, where HAEs in a set are independent but share a local memory structure that is collocated with the set. For example, the first HAE 112 can be a set of HAEs, such that the first HAE 112 comprises multiple, independent HAEs that share the first local memory 116. In this architecture, for example, a first HAE in the set can write an output to the first local memory device 116 and a second HAE in the set can retrieve the output from the first local memory device 116, so that the output need not be written to one of the external memory devices 126-128 or read from one of the external memory devices 126-128, thereby improving efficiency compared to conventional approaches. In addition, as described above, data can be exchanged between the local memory devices 116-118 by way of the bridge, and thus, with respect to intermediate data processing, an output from one HAE to its local memory device can be transferred to another local memory device for another HAE without requiring such output to first be transferred to one of the external memory devices 126-128.

Figure 5:
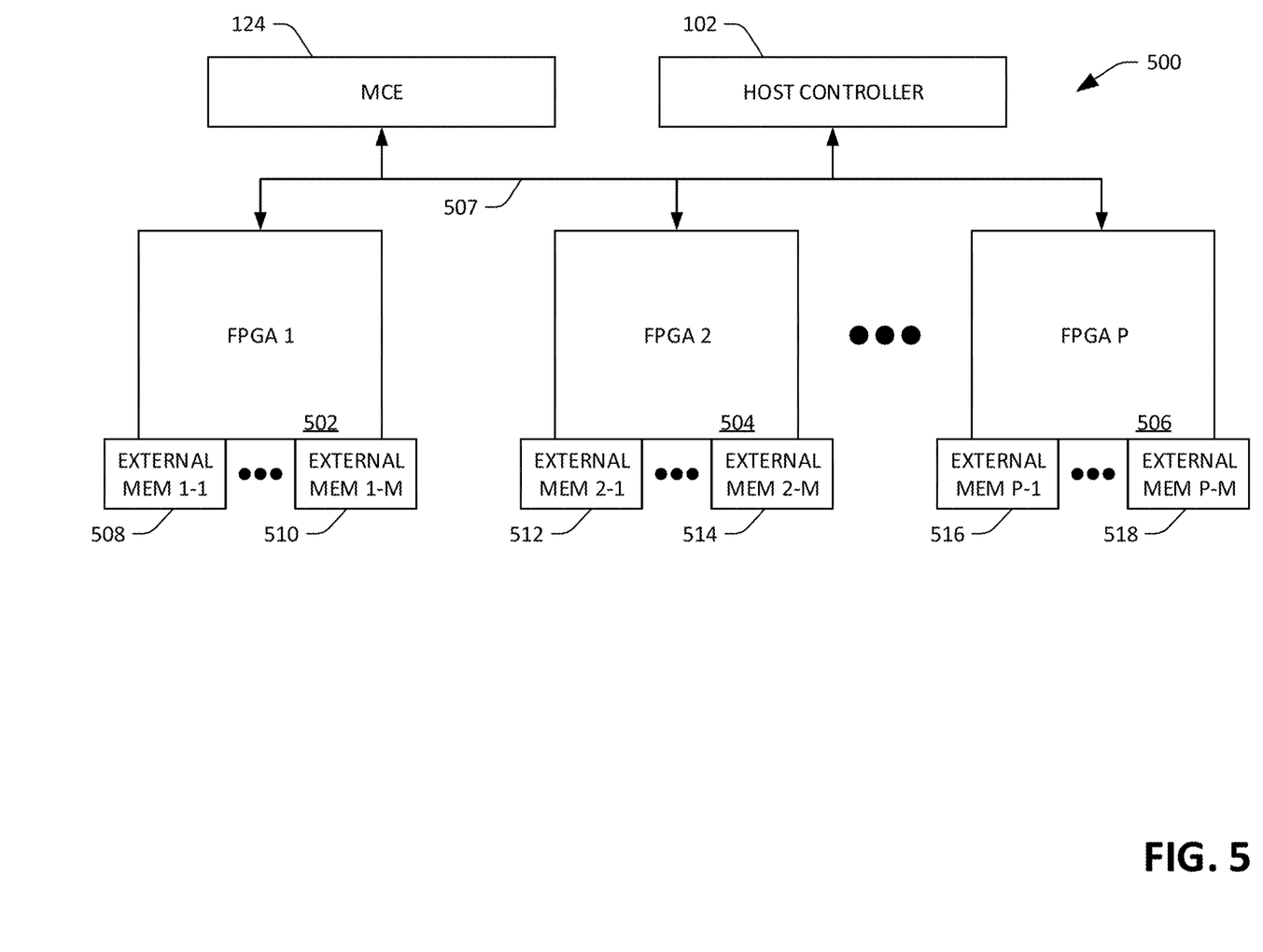
FIG. 5 is a functional block diagram of an exemplary computing system that includes several FPGAs that process data in parallel.

Now referring to FIG. 5, another exemplary computing system 500 that is well-suited for use in SWAP-constrained environments is illustrated. The computing system 500 includes the host controller 102 and the MCE 124. The computing system 500 further comprises multiple FPGAs 502-506 that are in communication with the host controller 102 and the MCE 124 by way of a suitable network 507. In such an example, the host controller 102 can communicate with the MCE 124 and the FPGAs 502-506 by way of the network driver 136. Further, optionally, the MCE 124 can include a network driver or can be on-chip with the host controller 102. Moreover, the host controller 102 and/or the MCE 124 can be internal to one of the FPGAs 502-506.

Each of the FPGAs 502-506 can have one or more external memory devices coupled thereto. As illustrated in FIG. 5, the first FPGA 502 has M external memory devices 508-510 coupled thereto, the second FPGA 504 has M external memory devices 512 through 514 coupled thereto, and the Pth FPGA 506 has M extra memory devices 516-518 coupled thereto. While each of the FPGAs 502-506 is illustrated as including M external memory devices coupled thereto, it is to be understood that different FPGAs may have a different number of external memory devices coupled thereto.

The host controller 102 and the MCE 124 operate as described above. That is, the host controller 102 executes the algorithm 104, and based upon execution of the algorithm, transmits instructions to the MCE 124 and HAEs in the fabrics of the FPGAs 502-506. The instructions to the MCE 124 are configured to cause data stored in external memory devices of the FPGAs 502-506 to be transferred to local memory devices of HAEs of the FPGAs, and the instructions to the HAEs are configured to cause the HAEs to perform processing operations (for which the HAEs are designed) on data in their local memory devices.

Figure 6:
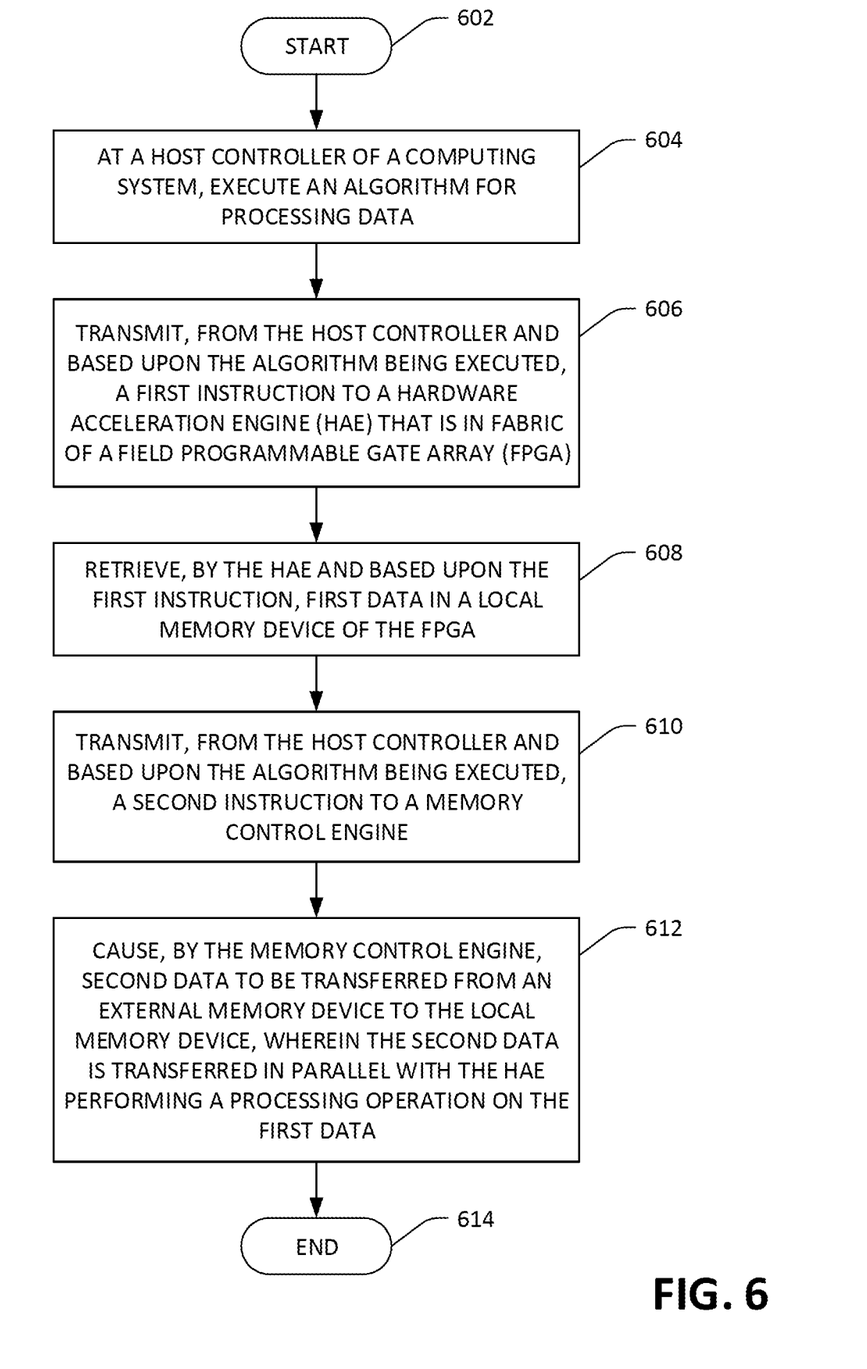
FIG. 6 is a flow diagram illustrating an exemplary methodology for executing an algorithm in a SWAP-constrained environment.

FIG. 6 is a flow diagram that illustrates an exemplary methodology relating to processing data in a SWAP-constrained environment. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

The methodology starts at 602, and at 604, at the host controller 102 of the computing system 100, the algorithm 104 is executed. The algorithm 104, when executed by the host controller 102, is configured to cause the computing system 100 to process data, wherein such data includes first data and second data that is different from the first data. Pursuant to an example, the first data is stored in the first local memory device 116 of the first HAE 112 and the second data is stored in the first external memory device 126 that is coupled to the FPGA 108.

At 606, from the host controller 102 and based upon the algorithm 104 being executed by the host controller 102, a first instruction is transmitted from the host controller 102 to the first hardware acceleration engine 112, wherein the first hardware acceleration engine 112 is in the FPGA fabric 110 of the FPGA 108. As indicated previously, the first instruction is configured to cause the first HAE 112, upon receiving the first instruction, to perform a processing operation on the first data stored in the first local memory device 116.

At 608, the first data is retrieved by the first HAE 112 from the first local memory device 116, and the first HAE 112 performs the processing operation on the retrieved first data.

At 610, based upon the host controller 102 executing the algorithm 104, the host controller 102 transmits a second instruction to the MCE 124. The second instruction, when received by the MCE 124, is configured to cause the second data that is stored in the first external memory device 126 to be transferred from the first external memory device 126 to the first local memory device 116 of the first HAE 112.

At 612, based upon the second instruction, the MCE 124 causes the second data to be transferred from the first external memory device 126 to the first local memory device 116 of the first HAE 112, such that the second data is placed in the first local memory device 116. The second data is transferred to the first local memory device 116 simultaneously with the first HAE 112 performing the processing operation on the first data. The methodology 600 completes at 614.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing system that is configured to process data, the computing system comprising:
   a host controller that executes an algorithm that is to be employed in connection with processing the data, wherein the data includes first data and second data that is different from the first data;
   a local memory device of a field programmable gate array (FPGA), wherein the local memory device has the first data stored therein;
   a hardware acceleration engine (HAE) implemented in fabric of the FPGA, wherein the HAE is operably coupled to the local memory device, wherein the host controller, based upon the algorithm, transmits a first instruction to the HAE, and further wherein the HAE, upon receipt of the first instruction, retrieves the first data from the local memory device, performs a processing operation on the first data, and generates output data upon performing the processing operation on the first data;
   an external memory device that is external to the FPGA and coupled to the FPGA, wherein the external memory device has the second data stored therein; and
   a memory control engine (MCE) that is operably coupled to the host controller and the external memory device, wherein the host controller, based upon the algorithm, transmits a second instruction to the MCE, and further wherein the MCE, upon receipt of the second instruction, causes the second data to be transferred from the external memory device to the local memory device, wherein the HAE performs the processing operation on the first data in parallel with the second data being transferred from the external memory device to the local memory device.

2. The computing system of claim 1, wherein the host controller is included in the FPGA.

3. The computing system of claim 1, wherein the host controller is external to the FPGA.

4. The computing system of claim 1, wherein the data comprises third data that is different from the first data and the second data, the computing system further comprising:
   a second local memory device of the FPGA, wherein the second local memory device has the third data stored therein; and
   a second HAE implemented in the fabric of the FPGA, wherein the second HAE is operably coupled to the second local memory device, wherein the host controller, based upon the algorithm, transmits a third instruction to the second HAE, wherein the second HAE, upon receipt of the third instruction, retrieves the third data from the second local memory device, performs a second processing operation on the third data, and generates second output data upon performing the second processing operation on the third data, and further wherein the second HAE performs the second processing operation on the third data in parallel with the HAE performing the processing operation on the first data and further in parallel with the second data being transferred from the external memory device to the local memory device.

5. The computing system of claim 1, wherein the MCE has access to a memory map that maps a virtual address space to physical addresses of the external memory device, wherein the second instruction identifies an address in the virtual address space, and further wherein the MCE, in response to receiving the second instruction:
- identifies the external memory device from amongst several possible external memory devices based upon the address in virtual address space identified in the second instruction; and
- causes the second data to be transferred from the external memory device to the local memory device responsive to identifying the external memory device.

6. The computing system of claim 5, further comprising a memory controller that is operably coupled to the external memory device, wherein the memory controller receives a third instruction from the MCE, the third instruction identifies a physical address of the second data in the external memory device, and further wherein the memory controller causes the second data to be transferred from the external memory device to the local memory device based upon the physical address of the second data in the external memory device identified in the third instruction.

7. The computing system of claim 1, wherein the local memory device is a Dual Port Static Random Access Memory (DP SRAM) device.

8. The computing system of claim 7, wherein the external memory device comprises at least one of a Double Data Rate Synchronous Dynamic Random-Access Memory (DDR SDRAM) device or a High Bandwidth Memory device.

9. The computing system of claim 8, wherein the data comprises third data that is different from the first data and the second data, the system further comprising:
- a second external memory device that is external to the FPGA, wherein the second external memory device has the third data stored therein, wherein the MCE is operably coupled to the second external memory device, wherein the host controller, based upon the algorithm, transmits a third instruction to the MCE, and further wherein the MCE, upon receipt of the third instruction, causes the third data to be transferred from the second external memory device to the local memory device, wherein the HAE performs the processing operation on the second data in parallel with the third data being transferred from the second external memory device to the local memory device.

10. The computing system of claim 8, wherein the data comprises third data that is different from the first data and the second data, wherein the external memory device has the third data stored therein, the system further comprising:
- a second local memory device of the FPGA, wherein the second local memory device is a second DP SRAM device; and
- a second HAE implemented in the fabric of the FPGA, wherein the second HAE is operably coupled to the second local memory device but is not operably coupled to the local memory device, wherein the host controller, based upon the algorithm, transmits a third instruction to the MCE, and further wherein the MCE, upon receipt of the third instructions, causes the third data to be transferred from the external memory device to the second local memory device in parallel with the HAE performing the processing operation on the first data.

11. The computing system of claim 1, wherein the data is an image generated by a focal plane array (FPA).

12. The computing system of claim 11, wherein the computing system is included in an orbiting man-made satellite, wherein the FPA is included in the satellite, and further wherein the image is of the earth from the orbiting satellite.

13. A method performed by a computing system, the method comprising:
- at a host controller of the computing system, executing an algorithm, wherein the algorithm, when executed by the host controller, is configured to cause the computing system to process data, wherein the data includes first data and second data that is different from the first data, and further wherein the first data is stored in a local memory device of a field programmable gate array (FPGA) and the second data is stored in an external memory device that is external to the FPGA;
- transmitting, from the host controller and based upon the algorithm being executed by the host controller, a first instruction to a hardware acceleration engine (HAE) that is in fabric of the FPGA, the first instruction is configured to cause the HAE to retrieve the first data from the local memory device and perform a processing operation on the first data;
- based upon the first instruction, retrieving, by the HAE, the first data from the local memory device of the FPGA and performing the processing operation on the first data;
- transmitting, from the host controller and based upon the algorithm being executed by the host controller, a second instruction to a memory control engine (MCE) that is operably coupled to the host controller, wherein the second instruction is configured to cause the second data to be read from the external memory device and written into the local memory device; and
- based upon the second instruction, causing, by the MCE, the second data to be read from the external memory device and written into the local memory device, wherein the second data is written into the local memory device while the HAE is performing the processing operation on the first data.

14. The method of claim 13, wherein the local memory device is a Dual Port Static Random Access Memory (DP SRAM) device.

15. The method of claim 14, wherein the second memory is one of a Double Data Rate Synchronous Dynamic Random-Access Memory (DDR SDRAM) device or a High Bandwidth Memory device.

16. The method of claim 13, wherein the data is an image generated by a focal plane array (FPA), wherein the first data is a first portion of the image, and the second data is a second portion of the image.

17. The method of claim 13, wherein the FPGA comprises the host controller.

18. The method of claim 13, wherein the data comprises third data that is different from the first data and the second data, the third data stored in a second local memory device of a second FPGA, the method further comprising:
- transmitting, from the host controller and based upon the algorithm being executed by the host controller, a third instruction to a second HAE that is in fabric of the second FPGA, the third instruction is configured to cause the second HAE to retrieve the third data from the second local memory device and perform a second processing operation on the third data; and
- based upon the third instruction, retrieving, by the second HAE, the third data from the second local memory device of the second FPGA and performing the second processing operation on the third data, wherein the second HAE performs the second processing operation on the third data in parallel with the HAE performing the processing operation on the first data.

19. The method of claim 13, wherein the second instruction includes a first address that identifies a location of the second data in a virtual address space, the method further comprising:

at the MCE, identifying a second address of the second data in physical address space of the second memory, wherein causing, by the MCE, the second data to be read from the external memory device and written to the local memory device comprises:

transmitting a third instruction from the memory controller to a memory controller for the external memory device, the third instruction comprises the second address, wherein the memory controller causes the second data to be read from the external memory device and written to the local memory device based upon the third instruction.

20. A field programmable gate array (FPGA) comprising:

a host controller that executes an algorithm that is to be employed in connection with processing data, wherein the data includes first data and second data that is different from the first data;

a local memory device of the field programmable gate array (FPGA), wherein the local memory device has the first data stored therein;

a hardware acceleration engine (HAE) implemented in fabric of the FPGA, wherein the HAE is operably coupled to the local memory device, wherein the host controller, based upon the algorithm, transmits a first instruction to the HAE, and further wherein the HAE, upon receipt of the first instruction, retrieves the first data from the local memory device, performs a processing operation on the first data, and generates output data upon performing the processing operation on the first data; and a memory control engine (MCE) that is operably coupled to the host controller and an external memory device that is external to the FPGA, wherein the external memory device stores the second data, wherein the host controller, based upon the algorithm, transmits a second instruction to the MCE, wherein the MCE, upon receipt of the second instruction, causes the second data to be read from the external memory device and written to the local memory device, and further wherein the HAE processes the first data in parallel with the second data being read from the external memory device and written to the local memory device.

\* \* \* \* \*